United States Patent
Xu (10) Patent No.: US 12,241,613 B2
(45) Date of Patent: Mar. 4, 2025

(54) LIGHTING DEVICE WITH A SWING SEAT AND POWER GENERATING DEVICE FOR POWERING THE LIGHTING DEVICE

(71) Applicant: JINGDEZHEN CERAMIC UNIVERSITY, Jingdezhen (CN)

(72) Inventor: Zhihua Xu, Jingdezhen (CN)

(73) Assignee: JINGDEZHEN CERAMIC UNIVERSITY, Jingdezhen (CN)

( * ) Notice: Subject to any disclaimer, the term of this patent is extended or adjusted under 35 U.S.C. 154(b) by 0 days.

(21) Appl. No.: 18/631,714

(22) Filed: Apr. 10, 2024

(65) Prior Publication Data
US 2024/0344678 A1 Oct. 17, 2024

(30) Foreign Application Priority Data

Apr. 14, 2023 (CN) .......................... 202310398989.5

(51) Int. Cl.
*F21S 9/04* (2006.01)
*F21V 21/02* (2006.01)
*F21V 33/00* (2006.01)
*F21S 9/03* (2006.01)

(52) U.S. Cl.
CPC ................ *F21S 9/04* (2013.01); *F21V 21/02* (2013.01); *F21V 33/004* (2013.01); *F21V 33/008* (2013.01); *F21S 9/037* (2013.01)

(58) Field of Classification Search
CPC ................................. F21S 9/04; F21V 33/008
See application file for complete search history.

(56) References Cited

FOREIGN PATENT DOCUMENTS

CN 205746492 U * 11/2016

* cited by examiner

*Primary Examiner* — Robert J May
(74) *Attorney, Agent, or Firm* — Kenealy Vaidya LLP (57) ABSTRACT

Provided is an environmental-friendly environmental art lighting device, including a lighting equipment main body, a swing seat, a power generation device, a first transmission device and a second transmission device. The power generation device is in transmission connection with the swing seat through the first transmission device and the second transmission device. The environmental-friendly environmental art lighting device provided has a power generation device and a swing seat arranged on a lamp bracket. When a pedestrian uses the swing seat for the act of swinging, the seat swings back and forth, a connecting shaft is driven to rotate counterclockwise or clockwise by swing arms, and a drive shaft is always driven to rotate towards one direction when the connecting shaft rotates counterclockwise or clockwise through the first transmission device and the second transmission device, thus driving a rotating shaft of a generator to rotate for power generation.

10 Claims, 7 Drawing Sheets

LIGHTING DEVICE WITH A SWING SEAT AND POWER GENERATING DEVICE FOR POWERING THE LIGHTING DEVICE

CROSS-REFERENCE TO RELATED APPLICATION

This patent application claims the benefit and priority of Chinese Patent Application No. 202310398989.5, entitled "ENVIRONMENTAL-FRIENDLY ENVIRONMENTAL ART LIGHTING DEVICE" filed on Apr. 14, 2023, the disclosure of which is incorporated by reference herein in its entirety as part of the present application.

TECHNICAL FIELD

The present disclosure relates to the field of artistic lighting, in particular to an environmental-friendly environmental art lighting device.

BACKGROUND

With the need of urban beautification, lighting and greening, urban night lighting has become an important part of urban environment, which is a combination of traffic lighting, residential lighting, commercial lighting, street lighting, building lighting and artistic lighting.

At present, in order to protect the environment and save energy, solar photovoltaic panels are usually arranged on the environmental art lighting equipment to supply power to the lighting equipment. However, the current lighting equipment is usually only equipped with a solar energy equipment, lacking the function of utilizing other clean energy sources. Especially for the artistic lighting equipment located in parks and other places, there is a lack of the function of converting mechanical energy generated by the activity of people in parks into electrical energy.

Therefore, it is necessary to provide an environmental-friendly environmental art lighting device for solving the technical problems above.

SUMMARY

The present disclosure provides an environmental-friendly environmental art lighting device, which solves the problem that the existing environmental-friendly environmental art lighting device lacks the function of utilizing other clean energy sources.

In order to solve the technical problem, the environmental-friendly environmental art lighting device provided by the present disclosure includes a lighting equipment main body, where the lighting equipment main body includes a lamp bracket and a lighting lamp body, and the lighting lamp body is mounted on the lamp bracket;
  a swing seat, including a connecting shaft, swing arms, and a seat, where the connecting shaft is rotatably mounted on the lamp bracket and is located below the lighting lamp body, and both ends of the seat are fixedly connected with the connecting shaft through the swing arms; and
  a power generation device, including a generator and a drive shaft, where the generator is mounted inside the lamp bracket, the drive shaft is mounted on a rotating shaft of the generator through a connecting member, and both ends of the drive shaft are connected with both ends of the connecting shaft through a first transmission device and a second transmission device, respectively.

The first transmission device includes a first unilateral gear, a transmission shaft, a reversing gear, and a transmission member. The first unilateral gear is connected with one end of the connecting shaft, the transmission shaft is rotatably connected with the lamp bracket, the reversing gear is connected with the transmission shaft and is meshed with the first unilateral gear, and the transmission shaft is in transmission connection with one end of the drive shaft through the transmission member.

The second transmission device includes a second unilateral gear, a driven gear and a first toothed belt. The second unilateral gear is connected with an other end of the connecting shaft, the driven gear is connected with an other end of the drive shaft, and the second unilateral gear is in transmission connection with the driven gear through the first toothed belt.

In some embodiments, the first unilateral gear includes a unilateral bearing and a gear, the unilateral bearing is mounted on the connecting shaft, and the gear is mounted on the unilateral bearing.

In some embodiments, the transmission member includes a second toothed belt, and two transmission gears. The two transmission gears are connected with the transmission shaft and the drive shaft, respectively, and the two transmission gears are in transmission connection through the second toothed belt.

In some embodiments, the lamp bracket includes a support and a mounting portion. The mounting portion is mounted at a top of the support, and the lighting lamp body includes a lamp main body and a transparent cover plate. The lamp main body is mounted at a bottom of the mounting portion, the transparent cover plate is arranged at a bottom of the lamp main body, and cleaning devices are arranged at the bottom of the mounting portion and on both sides of the lamp main body. Each of the cleaning devices includes a housing, a cleaning member and a horizontal driving device. The housing is mounted at the bottom of the mounting portion, and the cleaning member is mounted inside the housing. Both ends of the transparent cover plate correspondingly penetrate through the two housings and extend into the housings, a bottom of the transparent cover plate is in contact with the cleaning member, and the horizontal driving device is configured to drive the transparent cover plate to move horizontally.

In some embodiments, the horizontal driving device includes a drive mechanism and a driven mechanism. The drive mechanism and the driven mechanism are detachably mounted. The drive mechanism includes a driving shaft, a telescopic rod and a connecting frame. One end of the driving shaft is fixed to the second toothed belt through a fixing member, the connecting frame is connected with a bottom end of the telescopic rod, the driving shaft penetrates through the connecting frame, and a top end of the telescopic rod extends out of the support through a strip-shaped hole. The driven mechanism includes a connecting arm and a fixing shaft. A top end of the connecting arm is connected with the transparent cover plate through the fixing shaft, and a bottom end of the connecting arm is detachably connected with the top end of the telescopic rod.

In some embodiments, the drive mechanism further includes a connecting plate and at least one convex shaft. The connecting plate is connected with the top end of the telescopic rod, and the at least one convex shaft is connected with a top portion of the connecting plate. The driven mechanism further includes a positioning cylinder, the positioning cylinder penetrates through the bottom end of the connecting arm, and an anti-slip sleeve is arranged between the positioning cylinder and the connecting arm. The positioning cylinder is configured to be moved downwards to be sleeved outside the at least one convex shaft to achieve the connection between the drive mechanism and the driven mechanism.

In some embodiments, the at least one convex shaft comprises multiple convex shafts.

In some embodiments, a conical portion is provided at a bottom of the housing, the conical portion is filled with cleaning liquid, and the cleaning member includes a mounting shaft, a cleaning roller and a drive gear. The mounting shaft is rotatably mounted in the housing, the cleaning roller is mounted on the mounting shaft, and the drive gear is mounted on the mounting shaft. The lighting lamp body further includes teeth. The teeth are arranged at the bottom of the transparent cover plate and are meshed with the drive gear.

In some embodiments, the mounting shaft is a square shaft. The cleaning roller is sleeved on the mounting shaft, an elastic member is sleeved on the mounting shaft between the cleaning roller and the housing, a drive block is mounted at one end, adjacent to the drive gear, of the cleaning roller through a connector, each of both sides of the drive block is provided with an inclined surfaces, and the drive block abuts against the teeth.

In some embodiments, a water tank is arranged inside the mounting portion, and the water tank communicates with the housing through a liquid conveying pipe. A drainage pipe is connected with the housing, the liquid conveying pipe and the drainage pipe are provided with a first valve and a second valve, respectively. Touch switches for controlling the first valve and the second valve are arranged inside the housing, and the touch switches and the transparent cover plate are located on a same plane.

Compared with the prior art, the embodiments have the following beneficial effects.

The environmental-friendly environmental art lighting device provided by the embodiments is provided with the power generation device and the swing seat arranged on the lamp bracket. By taking advantage of the fact that people, especially children, like to swing, the swing seat, when used by a pedestrian for the act of swing, swings back and forth, the connecting shaft is driven to rotate counterclockwise or clockwise by swing arms, and the drive shaft is always driven to rotate towards one direction when the connecting shaft rotates counterclockwise or clockwise through the first transmission device and the second transmission device, thus driving the rotating shaft of a generator to rotate for power generation. Therefore, mechanical energy generated by the pedestrian swinging with the swing seat can be converted into electrical energy, and various forms of clean energy sources are utilized, and the device is more energy-saving and environmental-friendly.

BRIEF DESCRIPTION OF THE DRAWINGS

FIGS. 7A-7C are schematic diagrams of a cleaning device of the environmental-friendly environmental art lighting device according to the present disclosure, where

FIGS. 8A-8B are schematic diagrams of the cleaning member of the environmental-friendly environmental art lighting device according to the present disclosure vibrating along a mounting shaft, where

LIST OF THE REFERENCE CHARACTERS 1 lighting equipment main body; 11 support; 12 mounting portion; 12 lighting lamp body; 111 strip-shaped hole;
131 lamp main body; 132 transparent cover plate; 133 tooth;
2 swing seat; 21 connecting shaft; 22 swing arm; 23 seat;
3 power generation device; 31 generator; 32 drive shaft;
4 first transmission device; 41 first one way gear; 42 transmission shaft; 43 reversing gear; 44 transmission member; 441 transmission gear; 442 second toothed belt;
5 second transmission device; 51 second one way gear; 52 driven gear; 53 first toothed belt;
6 cleaning device; 61 housing; 62 cleaning member; 63 conical portion; 64 cleaning liquid;
621 mounting shaft; 622 cleaning roller; 623 drive gear; 624 drive block; 625 elastic member;
7 horizontal driving device; 71 drive mechanism, 72 driven mechanism;
711 driving shaft; 712 connecting plate; 713 convex shaft; 714 telescopic rod; 715 connecting frame;
721 connecting arm; 722 positioning cylinder; 723 fixing shaft;
8 liquid conveying pipe; 81 first valve;
9 drainage pipe; 91 second valve;
10 touch switch;
20 photovoltaic panel.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure provides an environmental-friendly environmental art lighting device.

Figure 1:
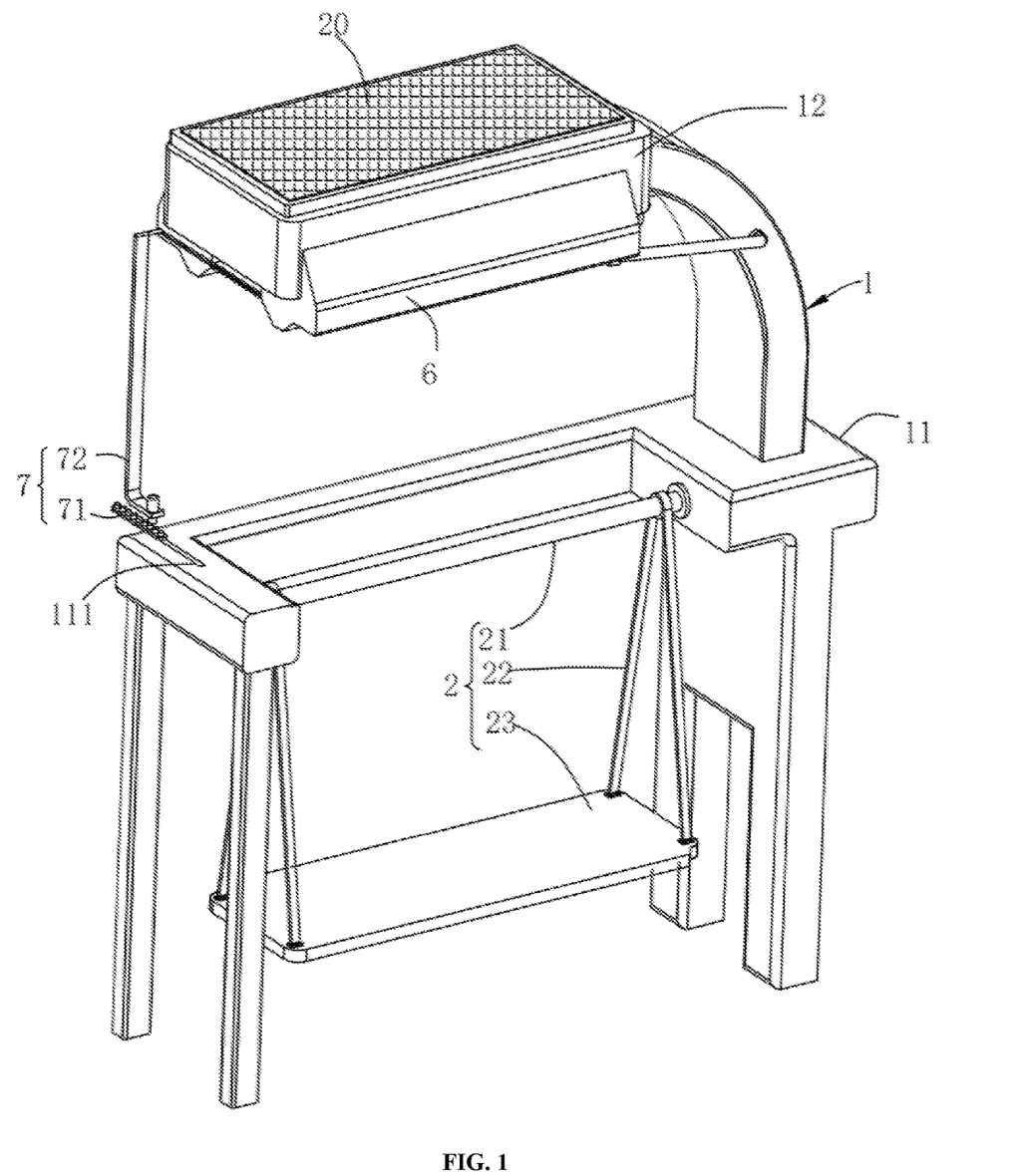
FIG. 1 is a structural schematic diagram of a preferred embodiment of an environmental-friendly environmental art lighting device according to the present disclosure.
Figure 2:
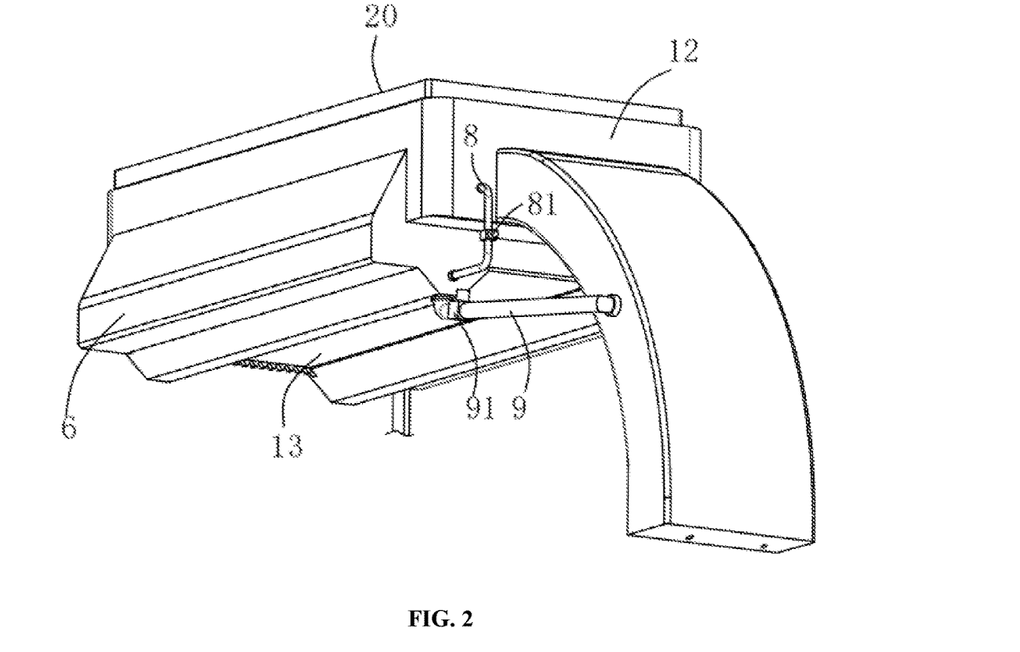
FIG. 2 is a schematic diagram of a partial structure shown in FIG. 1.
Figure 3:
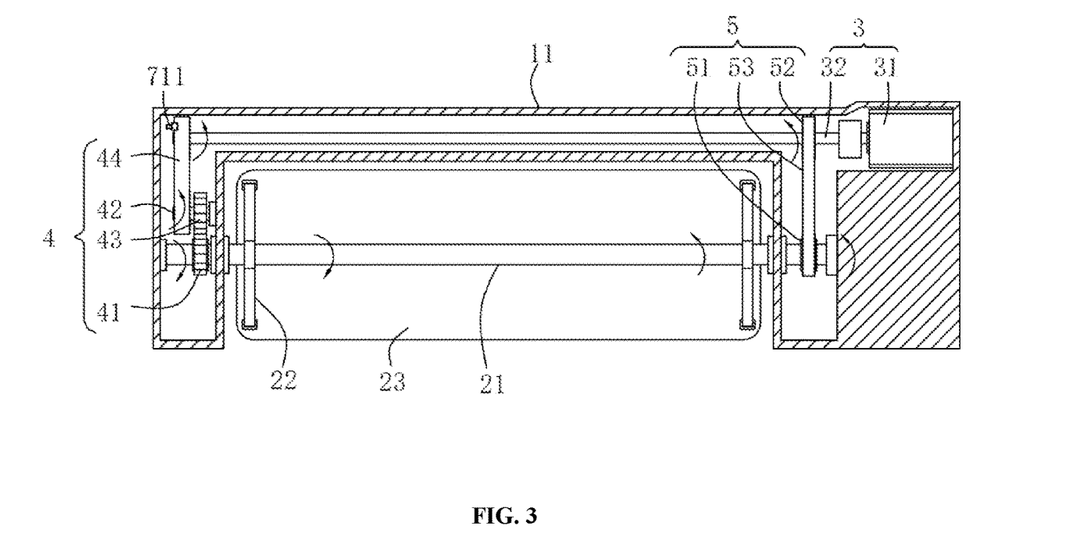
FIG. 3 is an overhead sectional view of a support shown in FIG. 1.

Please referring to FIG. 1 to FIG. 3, in an embodiment, the environmental-friendly environmental art lighting device includes a lighting equipment main body 1, where the lighting equipment main body 1 includes a lamp bracket, and a lighting lamp body 13, and the lighting lamp body 13 is mounted on the lamp bracket;

a swing seat 23, including a connecting shaft 21, swing arms 22 and a seat 23, where the connecting shaft 21 is rotatably mounted on the lamp bracket and is located below the lighting lamp body 13, and both ends of the seat 23 are fixedly connected with the connecting shaft 21 through the swing arms 22; and a power generation device 3, including a generator 31 and a drive shaft 32, where the generator 31 is mounted inside the lamp bracket, the drive shaft 32 is mounted on a rotating shaft of the generator 31 through a connecting member, and both ends of the drive shaft 32 are connected with both ends of the connecting shaft 21 through a first transmission device 4 and a second transmission device 5, respectively.

The first transmission device 4 includes a first unilateral gear 41, a transmission shaft 42, a reversing gear 43 and a transmission member 44. The first unilateral gear 41 is connected with one end of the connecting shaft 21, the transmission shaft 42 is rotatably connected with the lamp bracket, the reversing gear 43 is connected with the transmission shaft 42 and is meshed with the first unilateral gear 41, and the transmission shaft 42 is in transmission connection with one end of the drive shaft 32 through the transmission member 44.

The second transmission device 5 includes a second unilateral gear 51, a driven gear 52 and a first toothed belt 53. The second unilateral gear 51 is connected with the other end of the connecting shaft 21, the driven gear 52 is connected with the other end of the drive shaft 32, and the second unilateral gear 51 is in transmission connection with the driven gear 52 through the first toothed belt 53.

The top of the lamp bracket is provided with a photovoltaic panel 20, and is correspondingly provided with a controller, a storage battery, an inverter and other equipment for supporting. The lighting equipment is powered with the assistance of photovoltaic generation.

The environmental-friendly environmental art lighting device is mainly applied in parks, amusement parks and other places for the fun of pedestrians, and the main shape of the lighting device is to imitate the shape of animals turning their heads, such as the shape of giraffe turning its head.

The environmental-friendly environmental art lighting device provided by the present disclosure has the power generation device 3, and the swing seat 23 arranged on the lamp bracket. By taking advantage of the fact that people, especially children, like to swing, the swing seat 23, when used by a pedestrian for the act of swinging, swings back and forth, the connecting shaft 21 is driven to rotate counterclockwise or clockwise by the swing arms 22, and the drive shaft 32 is always driven to rotate towards one direction when the connecting shaft 21 rotates counterclockwise or clockwise through the first transmission device 4 and the second transmission device 5, thus driving the rotating shaft of the generator 31 to rotate for power generation. Therefore, mechanical energy generated by the pedestrian swinging with the swing seat 23 can be converted into electrical energy, and various forms of clean energy sources are utilized, and the device is more energy-saving and environmental-friendly.

In this embodiment, the connecting shaft 21 drives the drive shaft 32 to rotate by means of the first transmission device 4 and the second transmission device 5, with the principle as follows.

Please referring to FIG. 3, when the connecting shaft 21 rotates counterclockwise, the connecting shaft 21 drives the second unilateral gear 51 to rotate counterclockwise, and the first unilateral gear 41 is not driven to rotate. The second unilateral gear 51 drives the driven gear 52 to rotate through the first toothed belt 53, thus driving the drive shaft 32 to rotate counterclockwise. When the connecting shaft 21 rotates clockwise, the connecting shaft 21 drives the first unilateral gear 51 to rotate clockwise, the second unilateral gear 41 is not driven, the first unilateral gear 51 drives the reversing gear 43 to rotate counterclockwise, thus making the transmission shaft 42 rotate counterclockwise. The transmission shaft 42 drives the drive shaft 32 to rotate counterclockwise through the transmission member 44. Therefore, the connecting shaft 21, whether rotating clockwise or counterclockwise, can drive the drive shaft 32 to rotate.

The drive shaft 32 is connected with the rotating shaft of the generator 31 through the connecting member, and the connecting member is a speed increaser. In addition, the charger, the storage battery, the inverter and the like are provided for supporting the generator 31, so as to convert mechanical energy into electric energy. The electric energy is rectified by the charger, and is configured for charging an accumulator jar.

Please referring to FIG. 3, in one embodiment, the first unilateral gear 41 includes a unilateral bearing and a gear, the unilateral bearing is mounted on the connecting shaft 21, and the gear is mounted on the unilateral bearing.

By providing the combination of the unilateral gear and the gear, an inner ring of the unilateral gear is fixedly connected with the connecting shaft 21. When the connecting shaft 21 rotates clockwise, the connecting shaft 21 drives an outer ring of the unilateral gear to rotate through the inner ring of the unilateral gear, thus driving the gear to rotate. When the connecting shaft 21 rotates counterclockwise, the connecting shaft 21 drives the inner ring of the unilateral gear to rotate, without driving the outer ring of the unilateral gear to rotate, and the outer ring of the unilateral gear and the inner ring of the unilateral gear rotate relatively.

The second unilateral gear 51 and the first unilateral gear 41 have the same structure.

In other embodiments, the first unilateral gear 41 and the second unilateral gear 51 may employ a ratchet-pawl principle. The pawl is mounted on the connecting shaft 21, and the ratchet is arranged inward in the gear.

Figure 5:
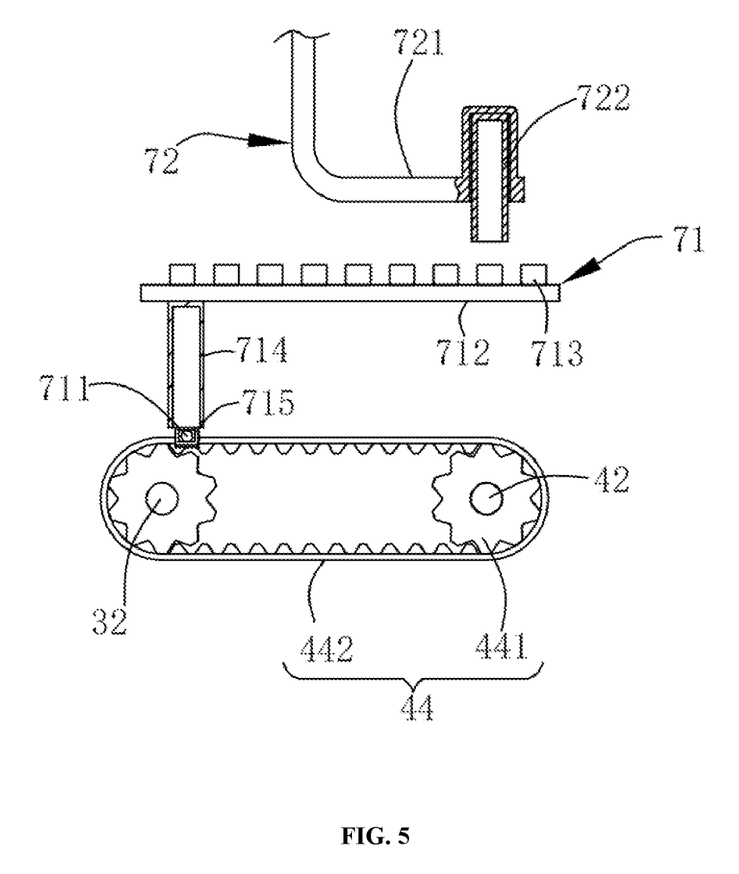
FIG. 5 is a structural schematic diagram of a horizontal driving device shown in FIG. 1.

Please referring to FIG. 3 and FIG. 5, in one embodiment, the transmission member 44 includes a second toothed belt 42 and two transmission gears 441. The two transmission gears 441 are connected with the transmission shaft 42 and the drive shaft 32, respectively, and the two transmission gears 441 are in transmission connection through the second toothed belt 442.

When the transmission shaft 42 rotates, the transmission gear 441 drives the transmission gear 441 on the drive shaft 32 through the second toothed belt 442, thus driving the drive shaft 32 to rotate.

In other embodiments, the transmission member 44 may also employ a chain wheel-chain combination.

Figure 4:
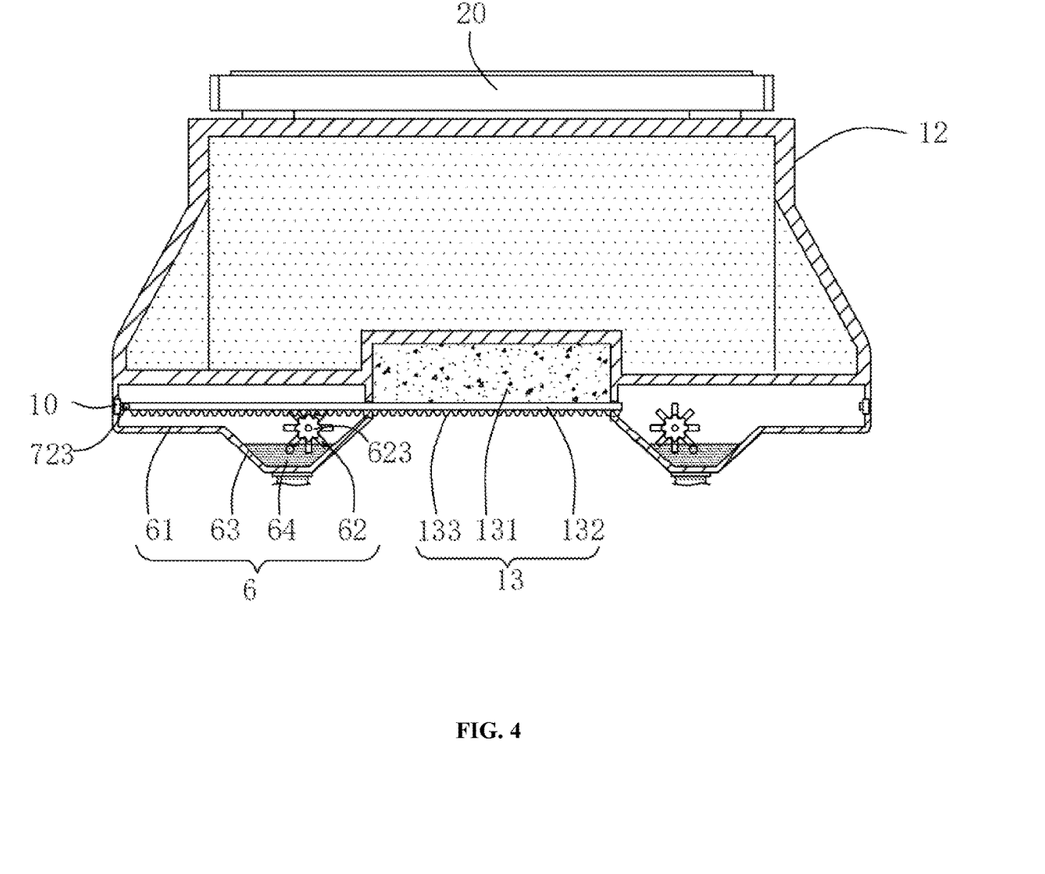
FIG. 4 is a sectional view of a mounting portion shown in FIG. 2.

Please referring to FIG. 1 and FIG. 4, the lamp bracket includes a support 11 and a mounting portion 12. The mounting portion 12 is mounted on the top of the support 11, and the lighting lamp body 13 includes a lamp main body 131 and a transparent cover plate 132. The lamp main body 131 is mounted at the bottom of the mounting portion 12, the transparent cover plate 132 is arranged at the bottom of the lamp main body 131, and cleaning devices 6 are arranged at the bottom of the mounting portion 12 and on both sides of the lamp main body 131. Each cleaning device 6 includes a housing 61, a cleaning member 62, and a horizontal driving device 7. The housing 61 is mounted at the bottom of the mounting portion 12, and the cleaning member 62 is mounted inside the housing 61. Both ends of the transparent cover plate 132 correspondingly penetrate through the two housings 61 and extend into the housings 61. The bottom of the transparent cover plate 132 is in contact with the cleaning member 62, and the horizontal driving device 7 is configured to drive the transparent cover plate 132 to move horizontally.

By providing the movable transparent cover plate 132 at the bottom of the lamp main body 131, when the lighting is affected due to the fact that foreign matters such as dust are adhered to a surface of the transparent cover plate 132, the horizontal driving device 7 drives the transparent cover plate 132 to interact with the cleaning member 62 to clean the bottom of the transparent cover plate 132 and keep the transparent cover plate 132 clean. By means of a way of adjusting the transparent cover plate 132 to interact with the cleaning member 62 for cleaning, when the lamp main body 131 is cleaned in use, the shadow generated when the lamp body is cleaned by using a brush and other equipment can be avoided.

The transparent cover plate 132 is made of a transparent plastic material or a glass material, the bottom portions of the two housings 61 are both provided with inclined planes, such that the function of illuminating the road surface beside the lighting device by the light of the lamp main body 131 to both sides is not affected.

In this embodiment, the horizontal driving device 7 may be an equipment such as cylinder and a hydraulic cylinder.

Please referring to FIG. 1 and FIG. 5, in a preferred embodiment, the horizontal driving device 7 includes a drive mechanism 71 and a driven mechanism 72. The drive mechanism 71 and the driven mechanism 72 are detachably mounted. The drive mechanism 71 includes a driving shaft 71, a telescopic rod 714 and a connecting frame 715. One end of the drive shaft 711 is fixed to the second toothed belt 442 through a fixing member, the connecting frame 715 is connected with a bottom end of the telescopic rod 714, the driving shaft 711 penetrates through the connecting frame 715, and a top end of the telescopic rod 714 extends out of the support 11 through a strip-shaped hole 111. The driven mechanism 72 includes a connecting arm 721 and a fixing shaft 723, the top end of the connecting arm 721 is connected with the transparent cover plate 132 through the fixing shaft 723, and the bottom end of the connecting arm 721 is detachably connected with the top end of the telescopic rod 714.

When the pedestrian uses the swing seat 23 for the act of swing, the transmission member 44 operates, the second toothed belt 442 in the transmission member 44 drives the driving shaft 711 to move horizontally, and the driving shaft 711 pushes the connecting frame 715 to drive the telescopic rod 714 to move accordingly, and the telescopic rod 714 drives the transparent cover plate 132 to move horizontally through the connecting arm 721 to interact with the cleaning member 62 to clean the transparent cover plate 132, without additionally providing other equipment such as cylinder and hydraulic cylinder, so energy conservation and environmental protection are achieved.

Figure 7A:
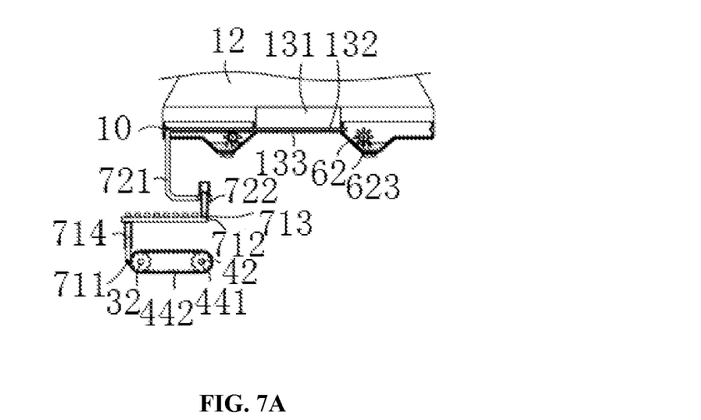
FIG. 7A is a schematic diagram of the assembly of a positioning cylinder and a convex shaft.
Figure 7B:
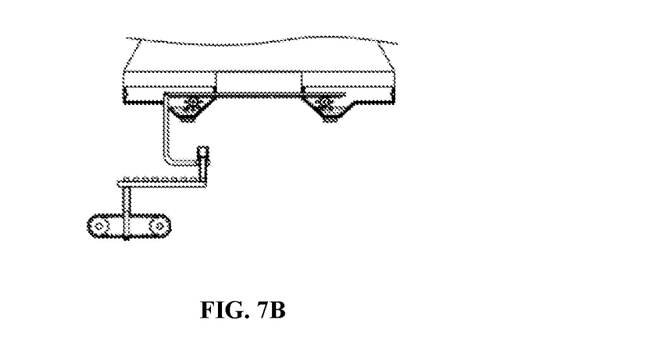
FIG. 7B is a schematic diagram showing that the horizontal driving device drives a transparent cover plate to interact with the cleaning member.
Figure 7C:
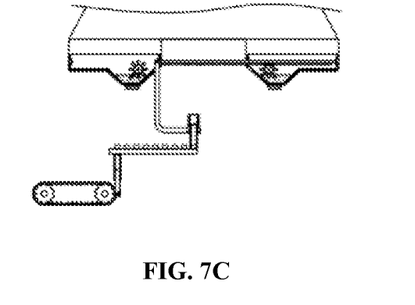
FIG. 7C is a schematic diagram showing that the horizontal driving device driving the transparent cover plate to complete one-time cleaning.

The telescopic rod 714 includes an outer cylinder and an inner rod, the outer cylinder is sleeved on the inner rod, and the connecting frame 715 is mounted at a bottom end of the inner rod. By providing the telescopic rod 714, as shown in FIGS. 7A-7B, when the driving shaft 711 is moved from an upper portion of the second toothed belt 442 to a lower portion, the inner rod extends out with respect to the outer cylinder, thus satisfying a height demand of moving along the upper portion and the lower portion of the second toothed belt 442. The moving stroke of the second toothed belt 442 is slightly greater than the width of the lamp main body 131, and the width of the transparent cover plate 132 is slightly greater than three times the width of the lamp main body 131.

The telescopic rod 714 and the connecting arm 721 are detachably mounted, which may be selected according to the following scenarios.

Scenario 1: When the lighting device may be mounted near a motorway and other environments with a lot of dust, the connection between the telescopic rod 714 and the connecting arm 721 may be always kept, and the transparent cover plate 132 may be cleaned as long as the pedestrian swings with the swing seat 23.

Scenario 2: When the lighting apparatus requires regular cleaning instead of frequent cleaning, the telescopic rod 714 is separated from the connecting arm 721. When the cleaning is required, the working staff may mount the telescopic rod 714 and the connecting arm 721, and the transparent cover plate 132 may be subsequently cleaned as long as the pedestrian swings with the swing seat 23, and there is no need to specially arrange manual cleaning.

Scenario 3: A slogan can be provided on the support 11 to remind people using the seat 23 to try to connect the telescopic rod 714 with the connecting arm 721 when feeling that the lighting effect is poor or more mosquitoes are attached to the lamp main body 131, and try to swing. Therefore, the user can clean the lighting device by himself as needed, without relying on the working staff. The transparent cover plate 132 can also drive away mosquitoes and so on when moving. Moreover, the user will not resistant the combination of the cleaning mode and swinging.

Please referring to FIG. 5, the drive mechanism 71 further includes a connecting plate 712 and convex shafts 713. The connecting plate 712 is connected with the top end of the telescopic rod 714, and the convex shafts 713 are connected with the top portion of the connecting plate 712. The driven mechanism 72 further includes a positioning cylinder 722 which penetrates through the bottom end of the connecting arm 721, and an anti-slip sleeve is arranged between the positioning cylinder 722 and the connecting arm 721. The positioning cylinder 722 is configured to be moved downwards to be sleeved outside the convex shaft 713 to connect the drive mechanism 71 and the driven mechanism 72.

The connection between the drive mechanism 71 and the driven mechanism 72 is achieving by pulling down the positioning cylinder 722 to be sleeved on the convex shaft 713, and the operation is simple and convenient.

The anti-slip sleeve is made of rubber or silica gel, and the positioning cylinder 722 may be stably connected with the connecting arm 721 by providing the anti-slip sleeve. Preferably, the connecting arm 721 is provided with a sleeve portion, an upper end of the positioning cylinder 722 is inserted into the sleeve, the anti-slip sleeve is arranged in the sleeve, thus increasing the contact area between the positioning cylinder 722 and the anti-slip sleeve and improving the stability.

As shown in FIG. 1, the connecting plate 712 is in sliding connection with a left top surface of the support 11.

Multiple convex shafts 713 are provided. By providing the multiple convex shafts 713, when the second toothed belt 442 drives the drive mechanism 71 to move to any position to stay, when the driven mechanism 72 needs to be connected with the drive mechanism 71, the positioning cylinder 722 is connected with the closest convex shaft 713, and thus the connection fault tolerance is improved.

Please referring to FIG. 4, a conical portion 63 is provided at the bottom of the housing 61. The conical portion 63 is filled with cleaning liquid 64, and the cleaning member 62 includes a mounting shaft 621, a cleaning roller 622 and a drive gear 623. The mounting shaft 621 is rotatably mounted in the housing 61, the cleaning roller 622 is mounted on the mounting shaft 621, and the drive gear 623 is mounted on the mounting shaft 621. The lighting lamp body 13 further includes teeth 133. The teeth 133 are arranged at the bottom of the transparent cover plate 113, and the teeth 133 are meshed with the drive gear 623. Multiple cleaning slivers are arranged around the surface of the cleaning roller 622.

When the horizontal driving device 7 drives the transparent cover plate 132 to move horizontally to interact with the cleaning member 62, the teeth 133 on one side of the transparent cover plate 132 interact with the drive gear 623 on one end of the cleaning roller 622 to drive the cleaning roller 622 to rotate. The cleaning cotton silvers on the cleaning roller 622 interact with the cleaning liquid inside the conical portion 63 to absorb the cleaning liquid and to clean the transparent cover plate 132. In addition, the transparent cover plate 132 is cleaned with the cooperation of the rotation of the cleaning roller 622, and the cleaning effect is improved.

The cleaning liquid is clear water or other cleaning liquid.

Preferably, dry surface blocks may be arranged on both sides of the cleaning roller 622, which can be configured to dry and wipe the cleaned transparent cover plate 132.

Figure 6:
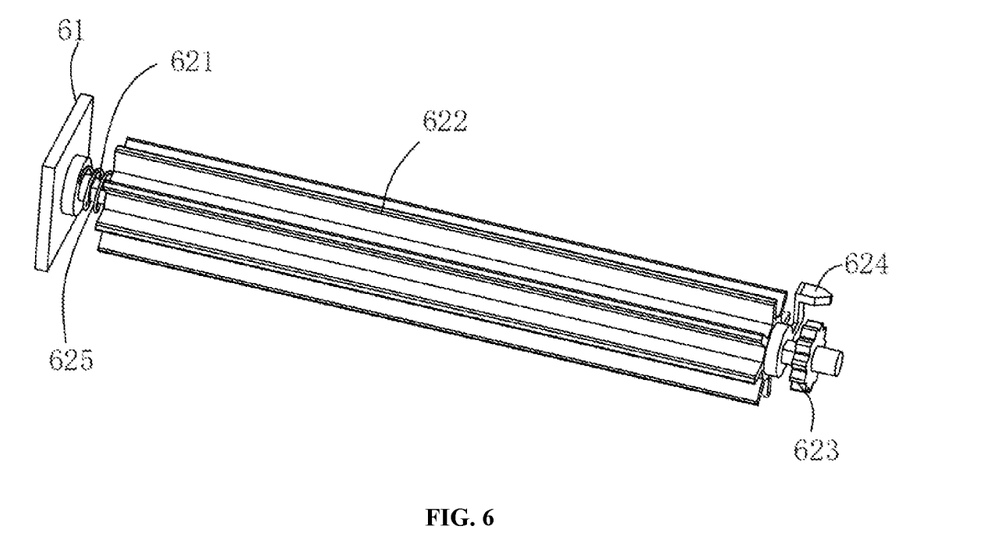
FIG. 6 is a structural schematic diagram of a cleaning member shown in FIG. 4.

Please referring to FIG. 4 and FIG. 6, the mounting shaft 621 is a square shaft, the cleaning roller 622 is sleeved on the mounting shaft 621, an elastic member 625 is sleeved on the mounting shaft 621 between the cleaning roller 622 and the housing 61, a drive block 624 is mounted at one end, adjacent to the drive gear 623, of the cleaning roller 622 through a connecting frame, both sides of the drive block 624 are provided with inclined surfaces, and the drive block 624 abuts against the teeth 133.

When the horizontal driving device 7 drives the transparent cover plate 132 to move horizontally to intersect with the cleaning member 62, the teeth 133 on one side of the transparent cover plate 132 intersect with the drive gear 623 at one end of the cleaning roller 622 to drive the cleaning roller 622 to rotate. In addition, the drive block 624 intersects with the teeth 13 and a tooth space formed between the adjacent teeth 133, and cooperates with the elastic member 625 to make the cleaning roller 622 vibrate back and forth along the mounting shaft 621. Therefore, when the cleaning cotton silvers intersect with the cleaning liquid, the foreign matters such as dust wiped on the cleaning cotton silvers can be cleaned through the vibration, and the cleaning effect is improved.

Figure 8A:
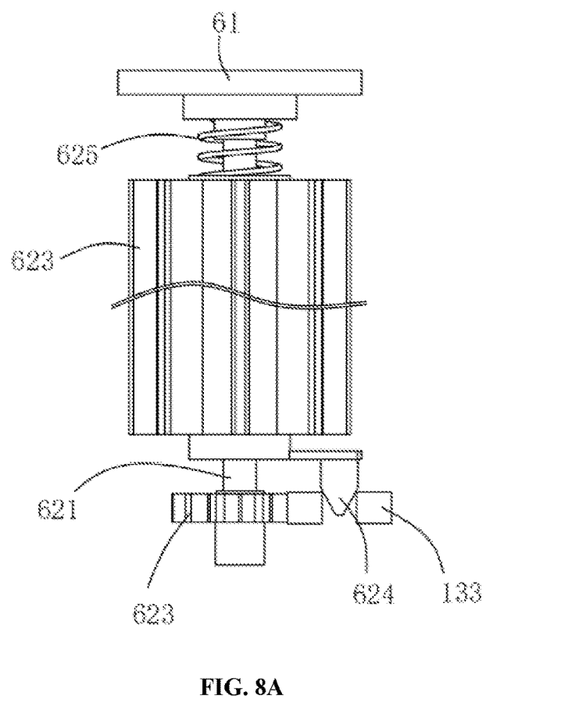
FIG. 8A is a schematic diagram showing that that a drive block is located in a tooth space between adjacent teeth.
Figure 8B:
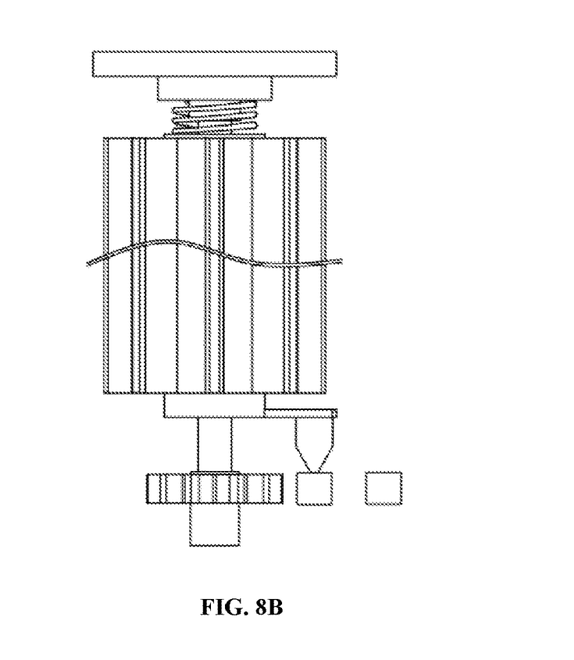
FIG. 8B is a schematic diagram showing that the drive block and the teeth abut against a cleaning roller to squeeze an elastic member.

Please referring to FIGS. 8A-8B, the vibration principle of the cleaning roller 622 is as follows. When the inclined plane of the drive block 624 intersect with the teeth 133, the lateral surface of the teeth 133 presses the inclined plane of the drive block 624 to push the cleaning roller 622 to squeeze and compress the elastic member 625. When the teeth 133 move to the tooth space to correspond to the drive block with the transparent cover plate 132, the cleaning roller 622 is pushed to an original position through the action of the elastic member 625, the drive block 624 is inserted into the tooth space again, and so on. The elastic member 625 is preferably a spring.

Please referring to FIG. 2 and FIG. 4, a water tank is arranged inside the mounting portion 12, and the water tank communicates with the housing 61 through a liquid conveying pipe 8. A drainage pipe 9 is connected with the housing 61, the liquid conveying pipe 8 and the drainage pipe 9 are provided with a first valve 81 and a second valve 91, respectively. Touch switches 10 for controlling the first valve 81 and the second valve 91 are arranged inside the housing 61, and the touch switches 10 and the transparent cover plate 132 are located on a same plane.

The water tank is provided to store the cleaning liquid 64, when the cleaning of the transparent cover plate 132 is completed every time, that is, an end of the transparent cover plate 132 is correspondingly pressed against the touch switch 10 located inside the left housing 61 or the touch switch 10 located inside the right housing 61, the second valve 91 is first controlled to open, at this time, the cleaning liquid 64 located inside the housing 61 is drained from the drainage pipe 9, the second valve 91 is closed, the first valve 81 is opened, and the cleaning liquid 64 in the water tank is replenished into the conical portion 63 inside the housing 61 to automatically replace the cleaning liquid 64 at first.

The drainage pipe 9 is connected with the bottom of the conical portion 63. The drainage pipe 9 runs along the inside of the support 11. The water tank is connected with a liquid replenishing pipe which runs along the inside of the support 11, and the liquid replenishing pipe is preferably connected with a water supply pipeline in a park or an amusement park.

By providing the water tank outside the lamp main body 131, the cleaning liquid can play a role in cooling the lamp main body 131.

The device is further provided with a processor and a timer, the touch switch 10 is connected with an output end of the processor, the timer is connected with the output end of the processor, and the first valve 81 and the second valve 91 are connected with an output end of the timer. The timer is configured for controlling the open time and open duration of the first valve 81 and the second valve 91.

The first valve 81 and the second valve 91 are both solenoid valves.

The operation principle of the environmental-friendly environmental art lighting device provided by the present disclosure is as follows.

When a pedestrian uses the swing seat 23 of the lighting equipment for the act of swing, the seat 23 swings, the connecting shaft 21 is driven to rotate clockwise or counterclockwise by the swing arms 22, and the connecting shaft 21 drives the drive shaft 32 to rotate towards one direction through the first transmission device 4 and the second transmission device 5, thus driving the rotating shaft of the generator 31 to rotate to achieve the power generation function.

During the swing operation, in the first transmission device 4, the second toothed belt 442 conveys the telescopic rod 714 to move horizontally, and the telescopic rod 714 drives the connecting plate 712 to move accordingly, thus driving the connecting arm 721 to move through the cooperation of the convex shaft 713 and the assembled positioning cylinder 722, and the connecting arm 721 drives the transparent cover plate 132 to move horizontally to interact with the cleaning member 62 for cleaning treatment.

The teeth 133 on one side of the transparent cover plate 132 interact with the drive gear 623 on the cleaning roller 622 to drive the cleaning roller 622 to rotate and interact with the cleaning liquid 64, so as to clean the transparent cover plate 132, and improve the cleaning effect.

The drive block 624 in the cleaning member 62 forms tooth space action with the teeth 133 and the adjacent teeth 133, and drives the cleaning roller 622 to vibrate horizontally along the mounting shaft 621 with the cooperation of the elastic member 625. The cleaning cotton slivers on the cleaning roller 622 intersect with the cleaning liquid 64 to facilitate the removal of foreign matters such as dust on the cleaning cotton slivers, thus improving the subsequent cleaning effect.

After the cleaning is completed, an end of the transparent cover plate 132 is correspondingly pressed against the corresponding touch switch 10, the touch switch 10 firstly controls the second valve 91 to open, at this time, the cleaning liquid 64 located inside the housing 61 is discharged from the drainage pipe 9, then the second valve 91 is closed, the first valve 81 is opened, and the cleaning liquid 64 in the water tank is replenished into the conical portion 63 inside the housing 61 to automatically replace the cleaning liquid 64.

The above is only the embodiments of the present disclosure and is not intended to limit the patent scope of the present disclosure. Any equivalent structure or equivalent flow transformation made by using the contents of the specification and drawings in the present disclosure, which is directly or indirectly used in other related technical fields, is equally included in the patent protection scope of the present disclosure.

What is claimed is:

1. An environmental-friendly environmental art lighting device, comprising a lighting equipment main body, wherein the lighting equipment main body comprises a lamp bracket, and a lighting lamp body, and the lighting lamp body is mounted on the lamp bracket;
    a swing seat, comprising a connecting shaft, swing arms and a seat, wherein the connecting shaft is rotatably mounted on the lamp bracket and is located below the lighting lamp body, and both ends of the seat are fixedly connected with the connecting shaft through the swing arms;
    a power generation device, comprising a generator and a drive shaft, wherein the generator is mounted inside the lamp bracket, the drive shaft is mounted on a rotating shaft of the generator through a connecting member, and both ends of the drive shaft are connected with both ends of the connecting shaft through a first transmission device and a second transmission device, respectively;
    wherein the first transmission device comprises a first unilateral gear, a transmission shaft, a reversing gear and a transmission member; the first unilateral gear is connected with one end of the connecting shaft, the transmission shaft is rotatably connected with the lamp bracket, the reversing gear is connected with the transmission shaft and is meshed with the first unilateral gear, and the transmission shaft is in transmission connection with one end of the drive shaft through the transmission member;
    the second transmission device comprises a second unilateral gear, a driven gear and a first toothed belt; the second unilateral gear is connected with an other end of the connecting shaft, the driven gear is connected with an other end of the drive shaft, and the second unilateral gear is in transmission connection with the driven gear through the first toothed belt.

2. The environmental-friendly environmental art lighting device according to claim 1, wherein the first unilateral gear comprises a unilateral bearing and a gear, the unilateral bearing is mounted on the connecting shaft, and the gear is mounted on the unilateral bearing.

3. The environmental-friendly environmental art lighting device according to claim 1, wherein the transmission member comprises a second toothed belt and two transmission gears; and the two transmission gears are connected with the transmission shaft and the drive shaft, respectively, and the two transmission gears are in transmission connection through the second toothed belt.

4. The environmental-friendly environmental art lighting device according to claim 3, wherein the lamp bracket comprises a support and a mounting portion; the mounting portion is mounted at a top of the support; the lighting lamp body comprises a lamp main body and a transparent cover plate, the lamp main body is mounted at a bottom of the mounting portion, the transparent cover plate is arranged at a bottom of the lamp main body, and cleaning devices are arranged at the bottom of the mounting portion and on both sides of the lamp main body; each of the cleaning devices comprises a housing, a cleaning member and a horizontal driving device; the housing is mounted at the bottom of the mounting portion, and the cleaning member is mounted inside the housing; both ends of the transparent cover plate respectively penetrate through two housings and extend into the two housings, a bottom of the transparent cover plate is in contact with the cleaning member, and the horizontal driving device is configured to drive the transparent cover plate to move horizontally.

5. The environmental-friendly environmental art lighting device according to claim 4, wherein the horizontal driving device comprises a drive mechanism and a driven mechanism; the drive mechanism and the driven mechanism are detachably mounted; the drive mechanism comprises a driving shaft, a telescopic rod and a connecting frame; one end of the driving shaft is fixed to the second toothed belt through a fixing member, the connecting frame is connected with a bottom end of the telescopic rod, the driving shaft penetrates through the connecting frame, a top end of the telescopic rod extends out of the support through a strip-shaped hole; the driven mechanism comprises a connecting arm and a fixing shaft, a top end of the connecting arm is connected with the transparent cover plate through the fixing shaft, and a bottom end of the connecting arm is detachably connected with the top end of the telescopic rod.

6. The environmental-friendly environmental art lighting device according to claim 5, wherein the drive mechanism further comprises a connecting plate and at least one convex shaft; the connecting plate is connected with the top end of the telescopic rod, and the at least one convex shaft is connected with a top portion of the connecting plate; the driven mechanism further comprises a positioning cylinder, the positioning cylinder penetrates through the bottom end of the connecting arm, and an anti-slip sleeve is arranged between the positioning cylinder and the connecting arm; and wherein the positioning cylinder is configured to be moved downwards to be sleeved outside the at least one convex shaft to connect the drive mechanism and the driven mechanism.

7. The environmental-friendly environmental art lighting device according to claim 6, wherein the at least one convex shaft comprises a plurality of convex shafts.

8. The environmental-friendly environmental art lighting device according to claim 5, wherein a conical portion is provided at a bottom of the housing, the conical portion is filled with cleaning liquid, and the cleaning member comprises a mounting shaft, a cleaning roller and a drive gear; the mounting shaft is rotatably mounted in the housing, the cleaning roller is mounted on the mounting shaft, and the drive gear is mounted on the mounting shaft; the lighting lamp body further comprises teeth, the teeth are arranged at the bottom of the transparent cover plate and are meshed with the drive gear.

9. The environmental-friendly environmental art lighting device according to claim 8, wherein the mounting shaft is a square shaft, the cleaning roller is sleeved on the mounting shaft, an elastic member is sleeved on the mounting shaft between the cleaning roller and the housing, a drive block is mounted at one end, adjacent to the drive gear, of the cleaning roller through a connecting frame, each of both sides of the drive block is provided with an inclined surface, and the drive block abuts against the teeth.

10. The environmental-friendly environmental art lighting device according to claim 4, wherein a water tank is arranged inside the mounting portion, the water tank communicates with the housing through a liquid conveying pipe, a drainage pipe is connected with the housing, the liquid conveying pipe and the drainage pipe are provided with a first valve and a second valve, respectively, touch switches for controlling the first valve and the second valve are arranged inside the housing, and the touch switches and the transparent cover plate are located on a same plane.

\* \* \* \* \*